(12) United States Patent
Katayama et al.

(10) Patent No.: US 7,178,953 B2
(45) Date of Patent: Feb. 20, 2007

(54) VEHICLE HEADLIGHT OPTICAL AXIS CONTROL UNIT

(75) Inventors: Yoshio Katayama, Hyogo (JP); Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 39 days.

(21) Appl. No.: 10/847,389

(22) Filed: May 18, 2004

(65) Prior Publication Data

US 2005/0002195 A1 Jan. 6, 2005

(30) Foreign Application Priority Data

Jun. 6, 2003 (JP) ............... 2003-162624

(51) Int. Cl.
*G01B 13/18* (2006.01)
(52) U.S. Cl. .................. 362/460; 362/464; 362/465; 362/467
(58) Field of Classification Search ........... 362/460, 362/464, 465, 467, 45
See application file for complete search history.

(56) References Cited

U.S. PATENT DOCUMENTS 6,504,265 B2 * 1/2003 Toda et al. ............... 307/10.8

2003/0154792 A1  8/2003  Katayama

FOREIGN PATENT DOCUMENTS

| JP | 10-181424 A | 7/1998 |
| JP | 11-105620 A | 4/1999 |
| JP | 2000-233681 A | 8/2000 |

* cited by examiner

*Primary Examiner*—Sandra O'Shea
*Assistant Examiner*—Mark Tsidulko
(74) *Attorney, Agent, or Firm*—Sughrue Mion, PLLC

(57) ABSTRACT

A headlight optical axis control unit of a vehicle capable of reducing cost, improving accuracy and ensuring safety is provided. An inclination angle detecting sensor placed in the front of a vehicle is connected to a control unit, and includes two transceivers of ultrasonic sensors. The two transceivers obtain the levels at their locations from the phase differences between the emitted waves and the reflected waves from a road surface, and measure the inclination angle from the level differences. The inclination angle is continuously detected during running of the vehicle. The measured values of the inclination angle are subjected to the cumulative sum and cumulative averaging. According to the average value, the control unit adjusts the angle of the optical axis of the headlights via headlight optical axis control sections.

3 Claims, 5 Drawing Sheets

VEHICLE HEADLIGHT OPTICAL AXIS CONTROL UNIT

BACKGROUND OF THE INVENTION

1. Field of the Invention

The present invention relates to a vehicle headlight optical axis control unit for carrying out up and down control of the angle of the optical axis of vehicle headlights.

2. Description of Related Art

A vehicle such as an automobile performs longitudinal angular inclinations with respect to the direction parallel to a road because of variations in the number of occupants or a load during stopping, and variations of road conditions during running (the angle of the inclination is referred to as "inclination angle" from now on). At the same time, in accordance with the inclination angle, the optical axis of the headlights fixed to the vehicle varies with respect to the road surface. When the optical axis of the headlights is too upward with respect to the road surface, the light will blind oncoming motorists, whereas when the optical axis of the headlights is too downward, the sight of the driver becomes too narrow, thereby hindering safe driving of the vehicle. In view of this, it becomes essential to carry out the up and down control of the angle of the optical axis of the headlights (called "optical axis angle" from now on) with respect to the running direction of the vehicle in response to the inclination angle.

Up to now, a variety of headlight optical axis control units have been proposed which detect the inclination angle and adjust the optical axis angle. These control units are roughly divided into a dynamic control system and a static control system. The dynamic control system employs the optical axis control that detects the inclination angle during running and adjusts the optical axis angle continuously. In contrast, the static control system carries out the optical axis control only once (usually before the start of the vehicle), without detecting the inclination angle or adjusting the optical axis angle thereafter.

Among the dynamic control system, an optical axis control unit is proposed with the aim of improving the accuracy of the optical axis control and the endurance of the components of the control unit such as an actuator (see, Relevant Reference 1, for example).

The technique disclosed in Relevant Reference 1 places sensors for detecting the amount of displacement from the road surface at the front and rear sides of the vehicle, averages the amounts of displacement detected by the sensors, and calculates the inclination angle from the two average values. Then, it determines the optical axis angle to be adjusted from the thus calculated inclination angle, and carries out the optical axis control. The calculation by the averaging and the optical axis control are carried out as a pair that is performed successively during running of the vehicle.

Among the static control system, an optical axis control unit is proposed which calculates the average value of a plurality of data on the inclination angle during stopping of the vehicle, adjusts the optical axis angle in accordance with the average value during stopping, and fixes the optical axis angle to the adjusted one during running. In this case, the inclination angle is detected by stroke sensors attached to front and rear wheels of the vehicle (see, Relevant Reference 2, for example).

As another static control system, an optical axis control unit is proposed which solves the problem of the inclination angle of a vehicle, which occurs in the time lag from pressing down the accelerator during stopping of the vehicle to the beginning of the running state. It carries out the optical axis control on the basis of the data on the inclination angle at a specified time before the speed sensor detects the start. Thus, it circumvents the actuator drive according to the data on the turned-up inclination angle of the vehicle during the time lag (see, Relevant Reference 3, for example).

Relevant Reference 1: Japanese patent application laid-open No. 10-181424/1998 (pp. 3–5, and FIGS. 1 and 4).

Relevant Reference 2: Japanese patent application laid-open No. 11-105620 (p. 3, and FIGS. 1 and 2) Relevant Reference 3: Japanese patent application laid-open No. 2000-233681 (pp. 4–5, and FIGS. 1 and 3)

The conventional automatic optical axis angle adjusting apparatus for the automobile headlights with the foregoing configuration disclosed in the Relevant Reference 1, which is one of the dynamic control systems, has a limit in the improvement in the endurance or the reduction in the power consumption. It is difficult to reduce the number of operations of the actuator, an optical axis driving means, so that the driving mechanism components constituting the actuator such as a motor and gears are apt to be subjected to wear, thereby presenting a problem of increasing the cost in its entirety.

As for the conventional optical axis adjusting apparatus for the vehicle headlights disclosed in the Relevant Reference 2 and the auto-leveling apparatus for the automobile headlamps disclosed in the Relevant Reference 3, they are both the static control system. Accordingly, although they can curb the cost increase caused by the foregoing reasons, they cannot cope with large variations in the inclination angle during running, presenting a problem of the safety during running of the vehicle.

In addition, the Relevant References 1, 2 and 3 employ a method of measuring the inclination angle by placing the level sensors at the front and rear sides of the vehicle and by measuring the level difference between the two locations, or a method of measuring the inclination angle by placing a level sensor at one of the front and rear sides and by calculating the level difference from a reference level. Thus, they are apt to be subjected to a measurement error in the inclination angle due to a warp in the vehicle or to a depression in a tire, which impairs appropriate adjustment of the optical axis angle. In addition, depending on the types of the vehicle, they must include a dedicated sensor mounting component and a dedicated control unit, presenting a problem of increasing the cost.

SUMMARY OF THE INVENTION

The present invention is implemented to solve the foregoing problems. It is therefore an object of the present invention to provide a vehicle headlight optical axis control unit enabling a low cost and accurate optical axis control unit.

Another object of the present invention is to provide a long life vehicle headlight optical axis control unit.

Still another object of the present invention is to provide a vehicle headlight optical axis control unit capable of improving the safety during the vehicle running.

According to one aspect of the present invention, there is provided a vehicle headlight optical axis control unit including: an inclination angle detecting means for detecting an inclination angle in a longitudinal direction of a vehicle; a headlight driving means for tilting an optical axis of the headlights of the vehicle up and down; and a control means for controlling the headlight driving means, wherein the control means calculates a cumulative sum of measured values of the inclination angle sampled continuously by the inclination angle detecting means during running of the vehicle, and adjusts the angle of the optical axis of headlights by operating the headlight driving means according to an average value of the inclination angle obtained by averaging the cumulative sum.

Thus, the optical axis control unit in accordance with the present invention can improve its endurance and reduce the power consumption, there by being able to reduce the cost. In addition, since it can carry out the flexible optical axis control, it can cope with the variations in the inclination angle due to the loading and unloading and the getting on and off of the occupants, and hence sufficiently ensure the safety during running of the vehicle.

DETAILED DESCRIPTION OF THE PREFERRED EMBODIMENTS

The embodiments in accordance with the present invention will now be described with reference to the accompanying drawings.

Embodiment 1

Figure 1:
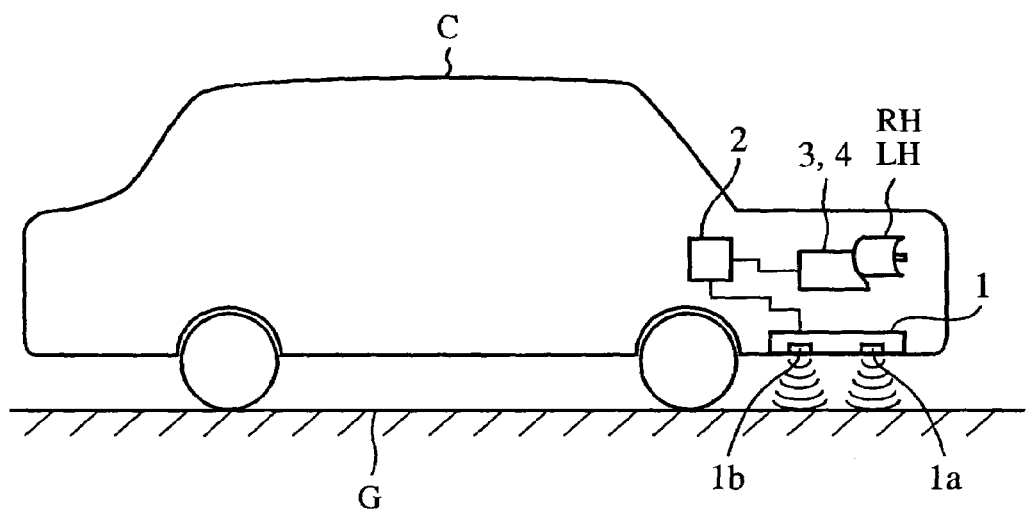
FIG. 1 is a schematic view showing a placement of an optical axis control unit of an embodiment in accordance with the present invention in a vehicle.
Figure 2:
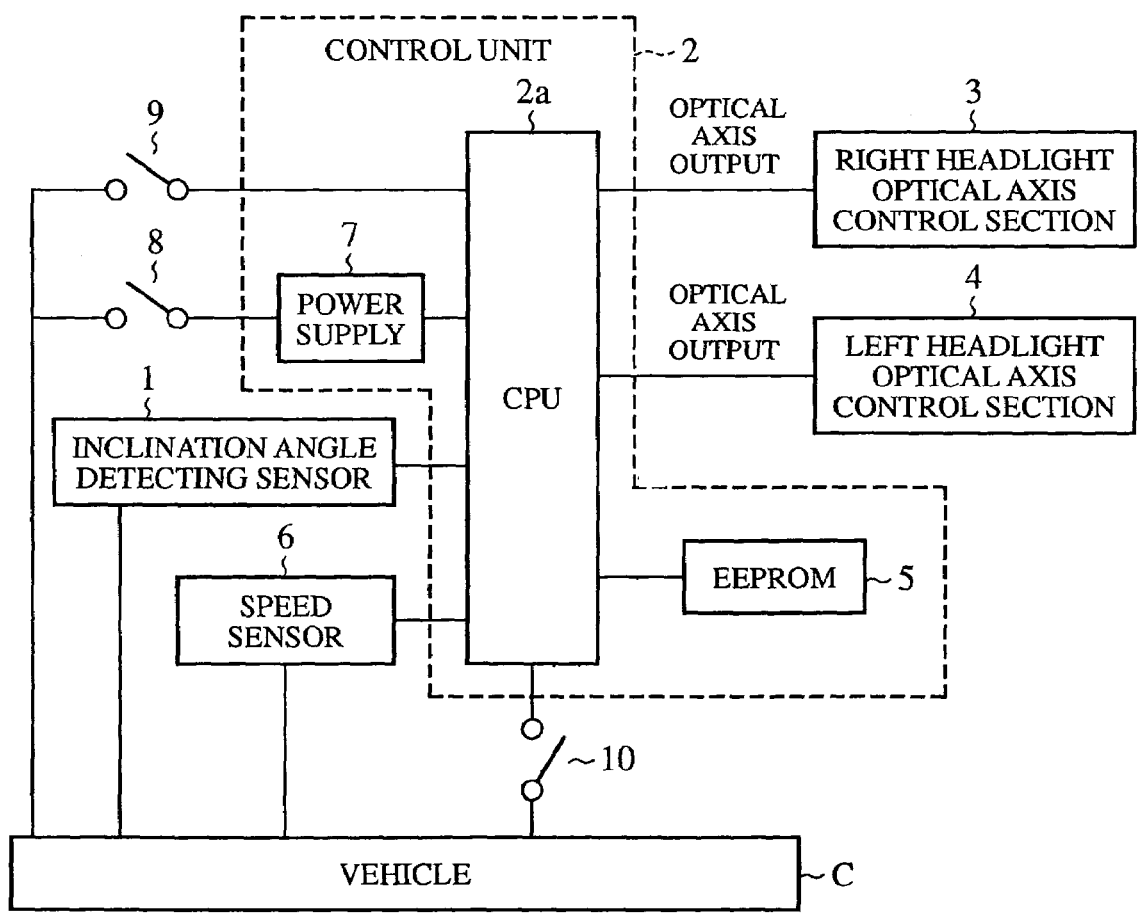
FIG. 2 is a block diagram of a headlight optical axis control unit of the embodiment in accordance with the present invention.

FIGS. 1–5 are drawings showing an embodiment 1 of a vehicle headlight optical axis control unit in accordance with the present invention. FIG. 1 is a schematic view of a vehicle, and FIG. 2 is a block diagram of the headlight optical axis control unit. In FIGS. 1 and 2, a vehicle C has in its front an inclination angle detecting sensor 1 including the transceivers 1a and 1b of two ultrasonic sensors separated apart by specified spacing which is equal to or less than one meter. The transceivers 1a and 1b of the ultrasonic sensors each measure the phase difference between the emitted wave (transmitted wave) and the reflected wave (received wave) from the road surface G, obtain the level from the phase difference, and calculate the inclination angle from the level difference. The optical axis control unit in accordance with the present invention continually samples the inclination angle during running of the vehicle, sums up the measured values of the inclination angle sampled (called "cumulative sum" from now on), and carries out the averaging (called "cumulative averaging" from now on). Then, according to the average value, it adjusts the optical axis angle.

The inclination angle detecting sensor 1 is electrically connected to the control unit 2 to which a right headlight optical axis control section 3 and a left headlight optical axis control section 4 are electrically connected. The right/left headlight optical axis control sections 3 and 4 are each composed of an actuator (a driving means of the headlight optical axis), a motor control section and the like, which belong to ordinary technology. The right/left headlight optical axis control sections 3 and 4 adjust the optical axis angles of the left and right headlights LH and RH.

The control unit 2 includes a CPU 2a for executing a variety of calculations; an EEPROM 5 for storing an initial value of the inclination angle, the sampling number (n), the measured values of the inclination angle sampled, and the average values calculated by the cumulative averaging; and a power supply 7. In addition, a speed sensor 6, an IG switch 8 (engine switch), a lighting switch 9 and an optical axis adjusting switch 10 are connected. The lighting switch 9 is used for turning on the headlights.

As for the IG switch 8 and optical axis adjusting switch 10, they are described later.

Next, the operation of the optical axis control will be described.

Figure 3:
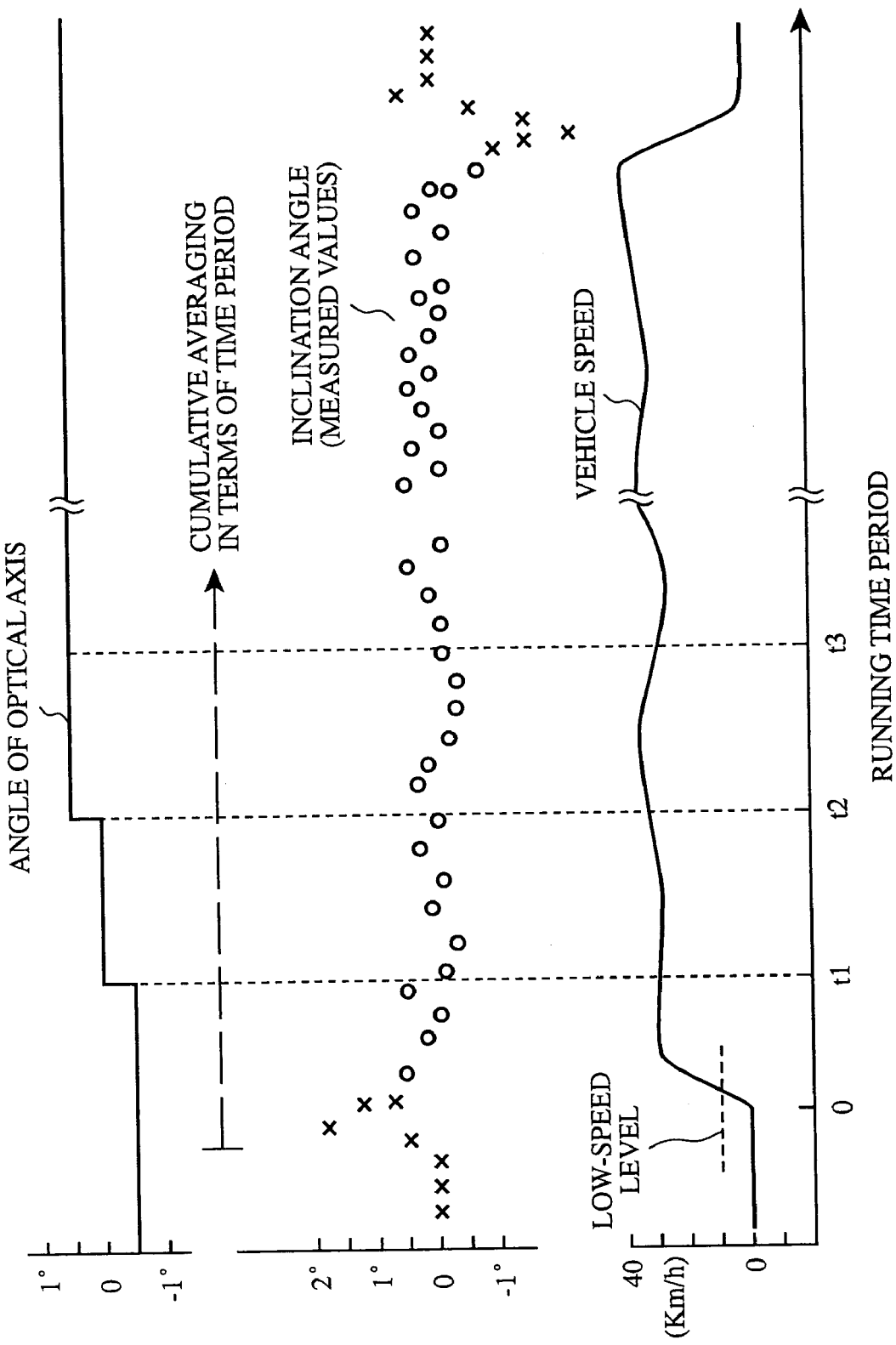
FIG. 3 is a graph illustrating the cumulative averaging of the inclination angle and the adjustment of the optical axis angle in an embodiment 1 in accordance with the present invention.
Figure 4:
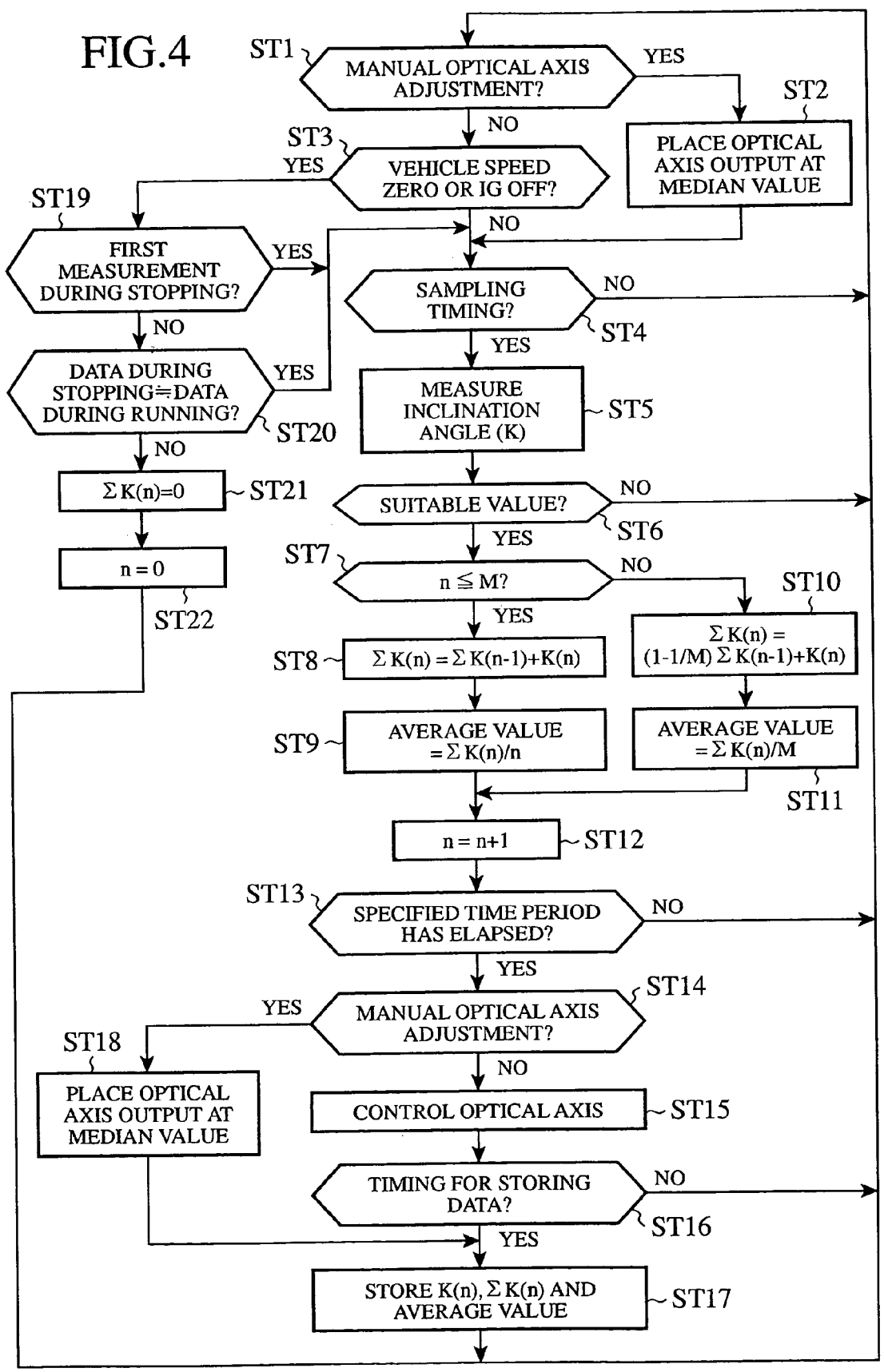
FIG. 4 is a flowchart illustrating the operation of the embodiment in accordance with the present invention.

FIG. 3 is a graph illustrating the cumulative averaging of the measured values of the inclination angle, which characterizes the present invention; and FIG. 4 is a flowchart illustrating the operation of the control unit 2. In FIG. 3, the horizontal axis represents the running time period of the vehicle, and the vertical axis represents the vehicle speed, the measured values of the inclination angle sampled, and the optical axis angle adjusted. As illustrated in FIG. 3, the vehicle, which is stopping at the running time period zero, is started by the IG on (engine start), and accelerates to the running condition. In the acceleration condition, the vehicle is raised at its front with respect to its back, so that the inclination angle increases up to about +2°. In the subsequent stable running condition, although the inclination angle fluctuates from sample to sample, it varies within about +/−0.2°. The variations are caused by the asperities or roughness on the road surface or gradient of the road.

According to the present invention, the cumulative averaging in terms of the time is carried out by accumulating the measured values (K) of the inclination angle sampled as illustrated in FIG. 3. As illustrated in FIG. 3, the cumulative averaging is performed by calculating the cumulative sum at time points t1, t2, t3, . . . , at which the optical axis control is carried out. For example, the arithmetic mean of the measured values K up to t1 (10 seconds, for example) is calculated to obtain the average value. Then, according to the average value at the time point t1, the optical axis angle is adjusted. For example, the optical axis angle is tilted upward from −0.5° to 0° in FIG. 3 (this optical axis angle 0° is called "median value" from now on). In this case, the minimum amount of displacement of the optical axis angle is set in advance. When that angle is set at 0.2°, for example, the optical axis angle is not adjusted when the average value is less than 0.2°. Thus, the right/left headlight optical axis control sections 3 and 4 including the actuators are kept inactive. Subsequently, the average value at time t2 (20 seconds, for example) is obtained by calculating the cumulative sum of the measured values K up to that time, followed by the cumulative averaging. It is important here to calculate the arithmetic mean at the time point t2 by accumulating the sampled values of the inclination angle up to the time point t1 as well. The optical axis angle is adjusted to +0.2° as described above. Likewise, the adjustment of the optical axis angle is carried out by performing the cumulative averaging up to the time point t3 (30 seconds, for example).

Thus continuing the cumulative averaging of the inclination angle during running makes it possible to sequentially add the measured values of the inclination angle, and hence to increase the data amount about the inclination angle, thereby being able to provide the accurate inclination angle of the vehicle with respect to the road surface, and to move the optical axis appropriately with respect to the average inclination of the vehicle. In the ordinary measurement of the inclination angle, one-time measurement cannot provide the correct inclination angle with respect to the road surface because of the local variations such as asperities or roughness on the road surface, and because of the backward and forward inclination due to the acceleration and deceleration of the vehicle. In contrast, the foregoing cumulative averaging can provide the stable, small average values of the inclination angle, almost all of which are smaller than the minimum amount of displacement (0.2°, for example). Thus, the adjustment of the optical axis angle becomes unnecessary as described above, thereby leaving the right/left headlight optical axis control sections 3 and 4 inactive for a long time.

When the vehicle is braked to the deceleration and stopping condition as illustrated in FIG. 3, and is made IG off (engine stop), the inclination angle opposite to that at the transition from the stopping condition to the running condition is exhibited. Incidentally, the values t1, t2, t3, . . . , can be set arbitrarily, so that the time intervals can be modified in a variety of ways.

It is also important for the sampling to select suitable measured values of the inclination angle. In FIG. 3, open circles are used for the cumulative averaging as suitable values, whereas the crosses are not used for the arithmetic mean as unsuitable values. The measured values during the acceleration/deceleration of the vehicle are not used as the suitable values. This is because the vehicle slants forward and backward with respect to the road surface during the acceleration/deceleration, and hence does not provide correct inclination angle. In addition, except in special circumstances, the measured values during the stopping of the vehicle are not used as the suitable values. This is because since the measured values of the inclination angle during stopping are obtained with respect to the same road surface, many of them are the same and un suitable for the cumulative averaging. Furthermore, even during running, the measured values during the low-speed level (less than 10 km/h, for example) are not employed as the suitable values as illustrated in FIG. 3. This is because the vehicle becomes unstable because of the half-clutched condition in the low-speed level. Moreover, sudden, sharply deviation values from the previous average values are not employed as the suitable values. This is because they can include errors due to the inclinations because of the asperities on the road surface or due to the effect of the wind. The measured values other than the foregoing values are used as the suitable values for calculating the arithmetic mean.

Next, the operation of the control unit will be described in more detail referring to the flowchart of FIG. 4. At step ST1 in FIG. 4, the control unit makes a decision as to whether to perform the manual optical axis adjustment or not. If the decision result is YES, the control unit proceeds to step ST2, and places the optical axis output at the median value. The median value corresponds to the initial value equal to the optical axis angle 0° as described in connection with FIG. 3. When carrying out the manual optical axis adjustment of the headlights (that is, when resetting them), the control unit sets the optical axis output of the headlights at a specified value (the initial value of the optical axis angle 0°), and stores the inclination angle measured at that time as the initial value of the measured values. Then, according to the amount of displacement of the inclination angle from the stored inclination angle which is measured during the operation of the control unit, the control unit controls the optical axis output of the headlights in such a manner that the output corresponds to the amount of displacement. To carry out the manual optical axis adjustment in this way, the optical axis adjusting switch 10 of FIG. 2 is turned on to place the optical axis output of the control unit at the median position, thereby resetting the optical axis angle to the value corresponding to the output. During the manual optical axis adjustment, although the electrical outputs of the control unit are fixed, the optical system of the headlights are moved to an appropriate optical axis position by the mechanical adjustment. In addition, the control unit stores as the initial value the measured value of the inclination angle measured by the inclination angle detecting sensor at that time. After completing the manual optical axis adjustment, the optical axis adjusting switch 10 is turned off, so that the control unit outputs the amount of displacement corresponding to the amount of displacement of the inclination angle as the optical axis output, thereby controlling the optical axis by automatic control.

If the suitable value of the inclination angle cannot be obtained by the normal control, the control unit does not vary the foregoing optical axis output of the headlights. Thus, the control unit maintains the optical axis without carrying out the moving operation until it recognizes the correct inclination angle. In addition, if it is likely that the optical axis control unit carries out abnormal operation, the optical axis output of the headlights is set at the specified value. For example, if the data stored in the EEPROM 5 is eliminated, or the battery is removed, the control unit produces the optical axis output that will return the optical axis to that at the optical axis adjustment, thereby resetting to the initial condition.

If the decision as to the manual optical axis adjustment at step ST1 is negative (NO), the control unit 2 makes a decision as to whether the vehicle speed is zero or IG is in the off state at step ST3. When the vehicle speed is not zero and the IG is in the on state, the control unit 2 makes a decision as to whether it reaches the sampling timing or not at step ST4. If the specified time period (0.1 second, for example) has elapsed, the control unit 2 measures the measured value (K) of the inclination angle at step ST5. Then, the control unit 2 makes a decision as to whether the value K is the suitable value described in connection with FIG. 3 or not at step ST6, followed by making a decision as to whether the sampling number n satisfies $n \leq M$ at step ST7. If $n \leq M$, the control unit 2 calculates the cumulative sum $\Sigma K(n) = \Sigma K(n-1) + K(n)$ of the values K at step ST8 as described in connection with FIG. 3, where $\Sigma K(n)$ and $\Sigma K(n-1)$ represent the sums up to the sampling number n and n−1, and the predetermined positive integer M is the limit of the cumulative averaging. The value M is determined considering the memory capacity of the EEPROM among other factors. Subsequently, the control unit 2 calculates the average value=$\Sigma K(n)/n$ at step ST9, thereby obtaining the cumulative average. In contrast with this, when the sampling number n exceeds M, the control unit 2 calculates the cumulative sum $\Sigma K(n) = [1-1/M]\Sigma K(n-1) + K(n)$ at step ST10, followed by calculating the average value=$\Sigma K(n)/M$ at step ST11. In this way, when the sampling number n exceeds the value M, the control unit 2 subtracts the average value up to the sampling number n−1 from the cumulative sum up to the same sampling number n−1, followed by adding the new measured value of the inclination angle at the sampling number n, thereby providing the cumulative sum. Even if the sampling number n further increases, the amount of the data of the cumulative sum is fixed to M by thus replacing the data used for the cumulative sum. Thus carrying out the averaging calculation can provide the average value.

Employing the foregoing method can make effective use of the newly added measured values because it can prevent the newly added measured values divided by M from being rounded off as in the conventional weighted averaging. In addition, limiting the number of the data subjected to the cumulative sum to M makes it possible to circumvent the boundless increase of the memory capacity of the storage such as the EEPROM even if the inclination angle is continuously measured during running as in the present invention, thereby offering an advantage of being able to reduce the cost.

Subsequently, the control unit 2 increments the sampling number n by one at step ST12, and makes a decision as to whether the specified time point has passed or not at step ST13. The specified time point refers to one of the time points t1, t2, t3, . . . , at which the control unit 2 carries out the specified optical axis control as described in connection with FIG. 3. Subsequently, the control unit makes a decision as to whether the manual optical axis adjustment is to be carried out or not at step ST14. If the manual optical axis adjustment is not carried out, the control unit 2 adjusts the optical axis angle at step ST15 of the optical axis control, followed by making a decision as to whether to store the data or not at step ST16. If the sampling elapsed time reaches the predetermined time period (10 minutes, for example), the control unit 2 stores the K(n), ΣK(n) and average value to the memory such as the EEPROM at step ST17. If the elapsed time has not yet reached the specified time period, the control unit 2 returns the processing to step ST1 of making the decision as to the manual optical axis adjustment. If a decision is made to carry out the manual optical axis adjustment at step ST14, the control unit 2 resets the optical axis output to the median value at step ST18 in the same manner as at step ST2.

Making a decision that the vehicle speed is zero or the IG is in the off state at step ST3, the control unit 2 advances the processing to step ST19 to decide as to whether to carry out the measurement of the inclination angle or not during stopping. To carry out the first measurement during stopping, the control unit 2 advances the processing to step ST4. To carry out the second or subsequent measurement during stopping, the control unit 2 compares the measured value data during stopping with the data during running at step ST20, and advances the processing to step ST4 if the two data are approximately equal. As for the measured values of the inclination angle during stopping, they become nearly equal even though many measured values are obtained over a long time because they are obtained with respect to the same road surface. In addition, if they are nearly equal to the data during running, this means that the average value does not vary in spite of an increase in the number of the samples. This is equivalent to an increase in the data during running, thereby providing a stable optical axis position.

On the other hand, if the two data compared at step ST20, the measured value data during stopping and the data during running, differ greatly from each other, it is likely that the measured values of the inclination angle, which differ from those with respect to the same road during stopping, are summed up successively, thereby producing erroneous optical axis output. Considering this, the control unit 2 eliminates the cumulative sum of the inclination angle at step ST21 and the sampling number at step ST22. In other words, the control unit 2 resets them to ΣK(n)=0 and n=0, and stops the measurement of the inclination angle thereafter.

Thus deleting all the previous cumulative sums of the inclination angle, the control unit 2 can carry out the optical axis control quickly and appropriately from the next start of running even when the number of occupants or the load varies during stopping or in the IG off state. This is because since the previous cumulative sums are reset to start the cumulative sum of the new measured values, the variations in the current measured values of the inclination angle have large effect on the cumulative averaging.

During running, the control unit 2 continues the cumulative averaging of the inclination angle. This enables the average values to be maintained at a stable small amount of displacement. In other words, almost all the average values become smaller than the specified minimum amount of displacement (0.2°, for example), thereby preventing the adjusting operation of the optical axis angle. As a result, the right/left headlight optical axis control sections 3 and 4 continue to be inactive over a long time. In this way, the optical axis control unit continues the operation similar to that of the static control system.

In addition, the optical axis control unit in accordance with the present invention can cope with a large inclination angle flexibly. Such a case occurs when the inclination angle varies sharply due to the loading and unloading or the changes in the number of the occupants. The optical axis control in such a case will be described with reference to the flowchart of FIG. 5.

Figure 5:
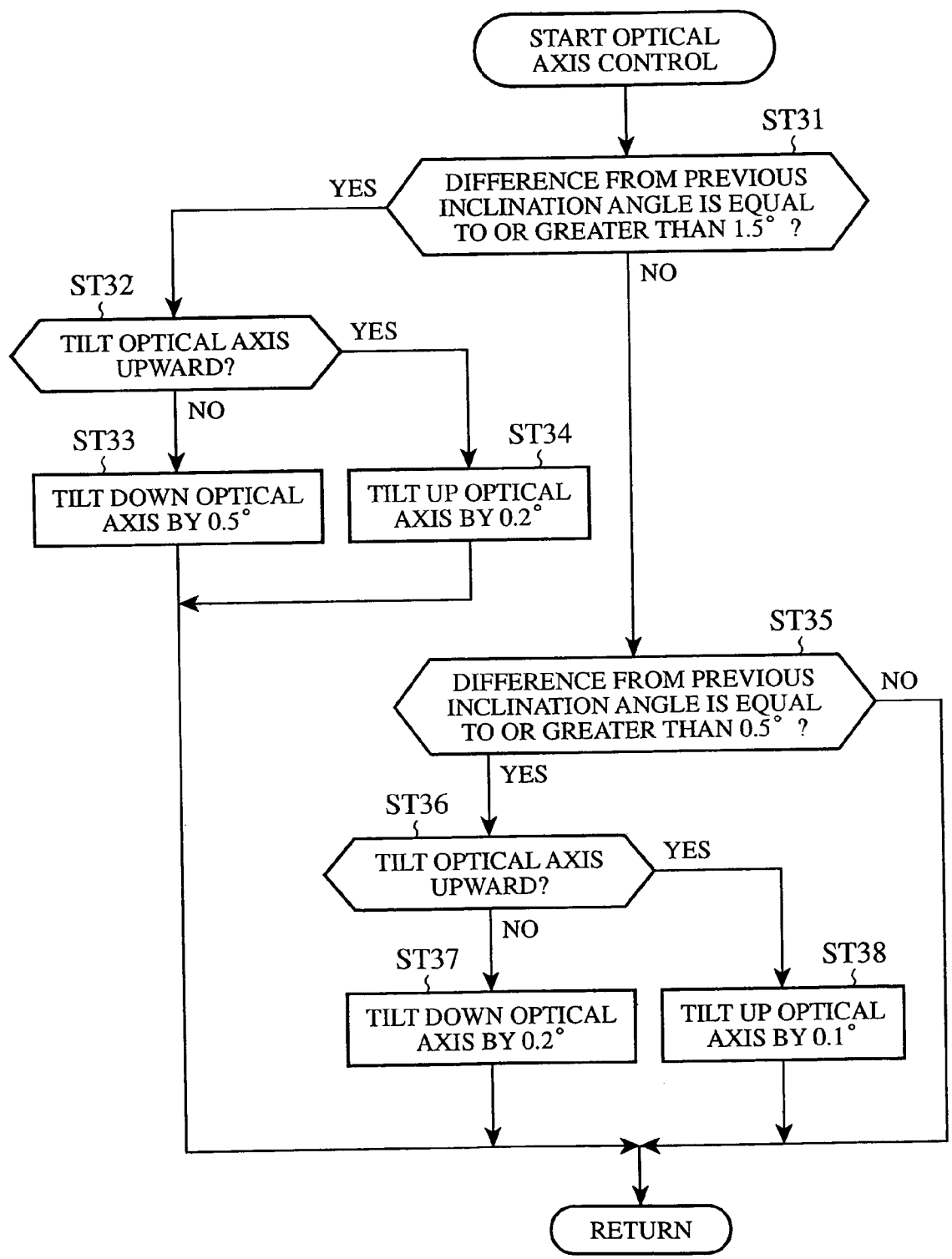
FIG. 5 is a flowchart of the optical axis control in the embodiment in accordance with the present invention.

At step ST31 of FIG. 5, the control unit 2 makes a decision as to whether the inclination angle passing through the cumulative averaging varies by an amount equal to or greater than 1.5°. If it is equal to or greater than 1.5°, the control unit 2 decides as to whether to tilt the optical axis upward step ST32. If the decision result is negative (NO), that is, if the optical axis must be tilted downward, the control unit 2 carries it out quickly at step ST33. Specifically, although the normal optical axis control has the minimum amount of displacement of 0.2° per tilting of the optical axis (0.2° step tilting), the control unit 2 tilts it by an amount of 0.5° per one operation (that is, 0.5° step tilting). In contrast with this, when a decision is made that the optical axis must be tilted upward at step ST32, the control unit 2 carries out the optical axis control of the 0.2° step tilting at step ST34. If a decision is made that the inclination angle is less than 1.5° at step ST31, the control unit 2 makes a decision as to whether the inclination angle is equal to or greater than 0.5° at step ST35. If a decision is made that it is equal to or greater than 0.5° at step ST35, similar operation is carries out. Specifically, the control unit 2 decides as to whether to tilt the optical axis upward at step ST36. If the decision result at step ST36 is negative (NO), that is, if the optical axis must be tilted downward, the control unit 2 carries out the 0.2° step tilting at step ST37. In contrast with this, when a decision is made that the optical axis must be tilted upward at step ST36, it is preferable that the control unit 2 carry out the optical axis control of 0.1° step tilting at step ST38, which is half the minimum amount of displacement of 0.2° and is specially prepared.

The foregoing optical axis control can ensure the safe running without blinding the drivers of oncoming vehicles. When the motor of the actuator is a DC motor, the 0.5° step tilting is employed. More specifically, when the inclination angle is less than 0.5° at step ST35, the DC motor of the actuator is not activated. This is because the DC motor has consumption components such as brushes, and hence frequent operation of the motor will reduce the life.

Furthermore, other flexible handling will be described. The following is an example of the optical axis control when the inclination angle after the cumulative averaging varies sharply. The optical axis control uses the 0.2° step tilting. Assume that the optical axis position immediately before the start of the vehicle is 0.5° and the time periods t1, t2, t3, . . . , described in connection with FIG. 3 are 10, 20 and 30 seconds, and that the inclination angle after the cumulative averaging at the time point t1 deviates by 1.5°. In this case, the optical axis control is carried out as follows. First, the control unit 2 carries out the 0.2° step tilting of the optical axis, thereby placing the optical axis at 0.7°. If the inclination angle after the cumulative averaging at the time point t2 varies to 0.9° the control unit 2 carries out the 0.2° step tilting again, thereby shifting the optical axis to 0.9°. If the inclination angle after the cumulative averaging varies to 1.2° at the time point t3, the control unit 2 carries out the 0.2° step tilting again to shift the optical axis position to 1.1°. Thus, the preferable optical axis control is performed. Furthermore, when the inclination angle after the cumulative averaging is stabilized at 1.0° over a long period running, the control unit 2 stops the adjustment of the optical axis angle, thereby leaving the right/left headlight optical axis control sections 3 and 4 inactive for a long time period.

The foregoing optical axis control can sharply reduce the number of times of driving the actuator for moving the optical axis until the inclination angle stabilizes.

It is also possible for the optical axis control to take the 0.5° step tilting into consideration. For example, when the inclination angle after the cumulative averaging deviates by 2.3° at the time point t1, the optical axis control is performed as follows. First, the control unit 2 carries out the 0.5° step tilting of the optical axis to place the optical axis at 1.0°. If the inclination angle after the cumulative averaging at the time point t2 varies to 1.9°, the control unit 2 carries out the 0.2° step tilting to shift the optical axis to 1.2°. Furthermore, if the inclination angle after the cumulative averaging at the time point t3 varies to 2.0°, the control unit 2 performs the 0.2° step tilting again to shift the optical axis to 1.4°. When the inclination angle after the cumulative averaging is stabilized at 2.0° after the long time running, the foregoing optical axis movement is repeated until completing the optical axis control. After that, the adjustment of the optical axis angle is made inoperative, thereby leaving the right/left headlight optical axis control sections 3 and 4 inactive for a long time period. In the present embodiment, if the suitable value of the inclination angle is not obtained, or the cumulative summing or the cumulative averaging of the inclination angle is not carried out, the control unit 2 halts the measurement of the inclination angle, as well as the operation of the ultrasonic sensors in the inclination angle detecting sensors. This operation is performed to prevent the degradation of the ultrasonic sensors, and to prevent abnormal reactions of animals because the ultrasonic frequency can reach audible regions of small animals.

As described above, the present embodiment 1 is configured such that it accumulates the measured values of the inclination angle of the vehicle, and increases the amount of the data on the inclination angle. Thus, it can obtain the accurate inclination angle of the vehicle with respect to the road surface, thereby being able to appropriately shift the optical axis with respect to the average inclination of the vehicle. In addition, since the optical axis control becomes quasi-static control during running of the vehicle, the present embodiment can improve the endurance of the optical axis control unit and reduce the power consumption. In particular, the reduction in the operation frequency of the actuator, the driving means of the headlight optical axis, makes it possible to curb the wear of the mechanical components such as the motor and gears, thereby being able to implement the long-life optical axis control unit. Furthermore, since the optical axis control unit in accordance with the present invention can carry out the flexible optical axis control, it can cope with the variations in the inclination angle due to the loading and unloading and the getting on and off of the occupants, and hence sufficiently ensure the safety during running of the vehicle.

In addition, according to the present invention, the inclination angle detecting sensor 1 can be installed in a small area less than a square meter immediately under the headlights. Thus, the detection errors can be eliminated of the inclination angle due to a warp of the vehicle, depressions in the tires and the like, which are shown in the conventional technology. Accordingly, the same components or the same control unit is applicable to a variety of vehicles regardless of their types. Therefore it offers an advantage of being able to implement the low-cost, safe optical axis control unit applicable to the vehicle headlight optical axis control unit with ease.

Embodiment 2

Figure 6:
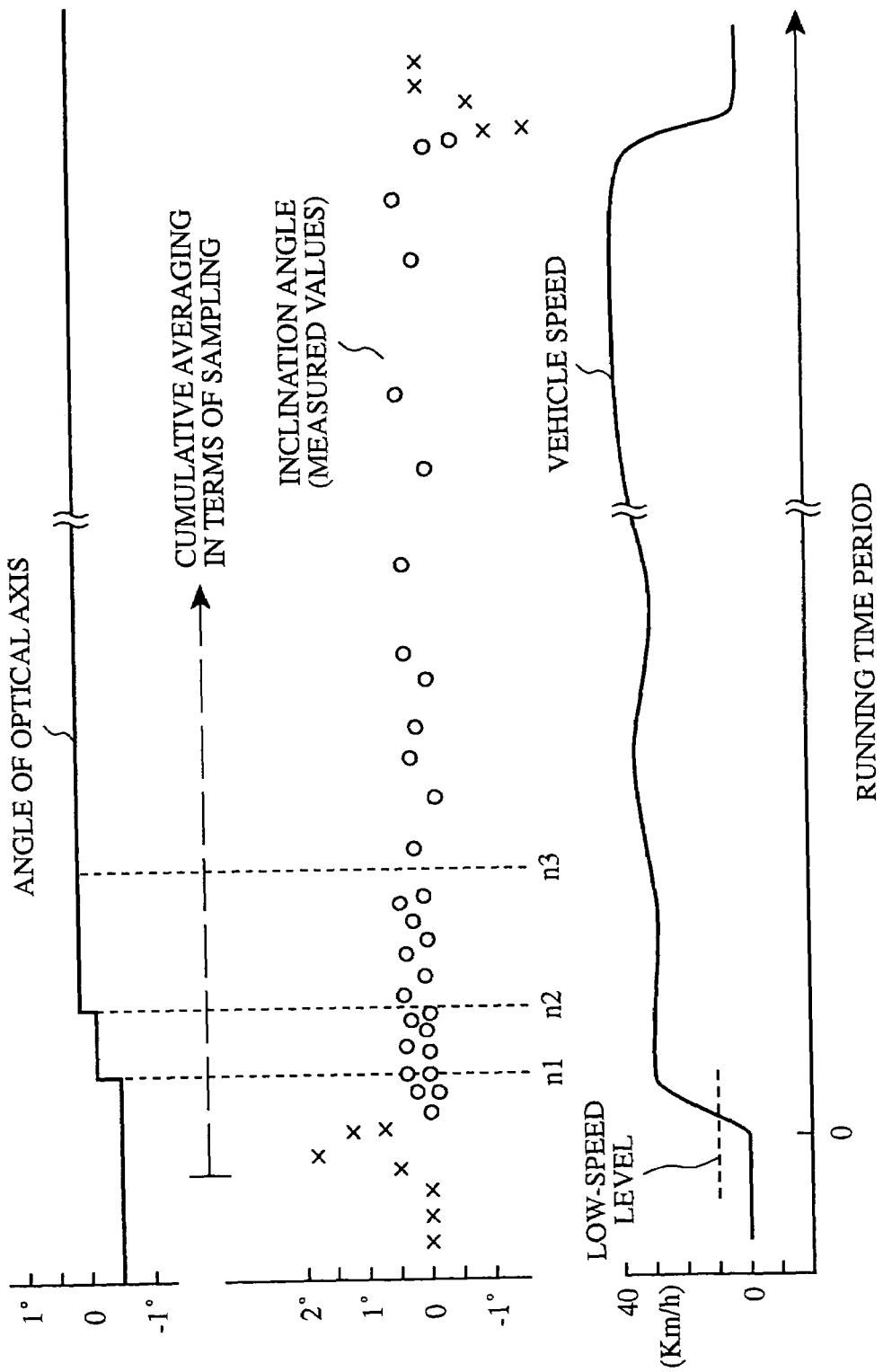
FIG. 6 is a graph illustrating the cumulative averaging of the inclination angle and the adjustment of the optical axis angle in an embodiment 2 in accordance with the present invention.

FIG. 6 is a graph illustrating the operation of the optical axis control in the embodiment 2 of the vehicle headlight optical axis control unit in accordance with the present invention. It corresponds to FIG. 3 of the embodiment 1, which is a graph illustrating the averaging operation of the inclination angle that characterizes the present invention. The embodiment 2 will be described with reference to FIG. 6 taking FIG. 4 into consideration in part. The present embodiment 2 differs from the embodiment 1, which carries out the cumulative averaging in terms of the time period as illustrated in FIG. 3, in that the embodiment 2 calculates the arithmetic mean by the cumulative averaging in the case where a predetermined number of samples of the inclination angle are stored. The points different from those of FIG. 3 will be described below.

In FIG. 6, the horizontal axis represents the running time period of the vehicle, and the vertical axis represents the vehicle speed, the measured values of the inclination angle sampled, and the optical axis angle adjusted. As illustrated in FIG. 6, the vehicle, which is stopping at the running time period zero, is started by turning on the IG switch 8, and accelerates to the running condition.

According to the present embodiment, the cumulative averaging in terms of the sample number is carried out by accumulating the measured values (K) of the inclination angle sampled as illustrated in FIG. 6. As illustrated in FIG. 6, the arithmetic mean is obtained by accumulating the measured values (K) up to the sampling numbers n1, n2, n3, . . . , of the inclination angle measurement. For example, the arithmetic mean of the measured values K up to n1 (100 samples, for example) is calculated to obtain the average value. Then, according to the average value at the point of n1, the optical axis angle is adjusted. For example, the optical axis angle is tilted upward from −0.5° to −0.3° in FIG. 6. Subsequently, the average value is obtained by calculating the arithmetic mean of the measured values K up to n2 (200 samples, for example). Then the optical axis angle is adjusted to +0.1° as described above. Likewise, the adjustment of the optical axis angle is carried out by performing the cumulative averaging up to n3 (300 samples, for example).

Thus continuing the cumulative averaging of the inclination angle during running makes it possible to stabilize the average values and to reduce the amount of displacement, thereby providing the average values, almost all of which are smaller than the minimum amount of displacement (0.2°, for example). Thus, the adjustment of the optical axis angle becomes unnecessary as described above, thereby leaving the right/left headlight optical axis control sections 3 and 4 inactive for a long time. In this case, it is also necessary for the sampling to select appropriate measured values of the inclination angle. In the flowchart of FIG. 4, the term "specified time point has passed" at step ST13 refers to the time point at which the specified sampling number is reached. The specified time points are the points n1, n2, n3, . . . , at which the specified optical axis control as illustrated in FIG. 6 is performed. For example, they can be the time point at which the sampling number reaches 100, although the values n1, n2, n3 . . . can be set arbitrarily. In this case also, only suitable values are extracted from the measured values of the inclination angle to calculate the cumulative sum as described in the foregoing embodiment 1.

According to the present embodiment 2, the advantages similar to those of the foregoing embodiment 1 are achieved. In addition, the present embodiment 2 has a further advantage over the foregoing embodiment 1 whose sampling number is variable, that the accuracy of the cumulative sum of the inclination angle and its average is stable because the sampling number is fixed.

In the present invention, it is also possible to use a combination of the cumulative averaging in terms of the time period in the foregoing embodiment 1 with the cumulative averaging in terms of the sample number of the embodiment 2.

What is claimed is:

1. A vehicle headlight optical axis control unit comprising:

inclination angle detecting means for detecting an inclination angle in a longitudinal direction of a vehicle;

headlight driving means for tilting an optical axis of at least one headlight of the vehicle up and down; and control means for calculating a cumulative sum of a variable number of measured values of the inclination angle sampled by said inclination angle detecting means during running of the vehicle, and for adjusting an angle of an optical axis of the headlight by operating said headlight driving means according to a cumulative average value of the inclination angle obtained by averaging the cumulative sum, wherein the inclination angle detecting means comprises an inclination angle detecting sensor directly measuring the inclination angle between the vehicle and a road surface at one point, and wherein under assumptions that K(n) is a measured value of the inclination angle at nth sampling, and M is a specified positive integer, said control means calculates the cumulative sum $\Sigma K(n)=\Sigma K(n-1)+K(n)$ and the average value=$\Sigma K(n)/n$ when $n \leq M$, and calculates the cumulative sum $\Sigma K(n)=\Sigma K(n-1)-\Sigma K(n-1)/M+K(n)$ and the average value=$\Sigma K(n)/M$ when n is greater than M.

2. A vehicle headlight optical axis control unit comprising:

inclination angle detecting means for detecting an inclination angle in a longitudinal direction of a vehicle;

headlight driving means for tilting an optical axis of at least one headlight of the vehicle up and down; and control means for calculating a cumulative sum of a variable number of measured values of the inclination angle sampled by said inclination angle detecting means during running of the vehicle, and for adjusting an angle of an optical axis of the headlight by operating said headlight driving means according to a cumulative average value of the inclination angle obtained by averaging the cumulative sum, wherein the inclination angle detecting means comprises an inclination angle detecting sensor directly measuring the inclination angle between the vehicle and a road surface at one point, and wherein said control means clears to zero the cumulative sum and average value of the inclination angle obtained during previous running, when the vehicle is stopping or an engine switch is in an off state, and restarts calculating the cumulative sum and average of the inclination angle simultaneously with a start of running of the vehicle.

3. A vehicle headlight optical axis control unit comprising:

inclination angle detecting means for detecting an inclination angle in a longitudinal direction of a vehicle;

headlight driving means for tilting an optical axis of at least one headlight of the vehicle up and down; and control means for calculating a cumulative sum of a variable number of measured values of the inclination angle sampled by said inclination angle detecting means during running of the vehicle, and for adjusting an angle of an optical axis of the headlight by operating said headlight driving means according to a cumulative average value of the inclination angle obtained by averaging the cumulative sum, wherein the inclination angle detecting means comprises an inclination angle detecting sensor directly measuring the inclination angle between the vehicle and a road surface at one point, and wherein said control means sets an output of the optical axis at a median value during manual adjustment of the optical axis, and stores the inclination angle detected at that time as an initial value.

\* \* \* \* \*